United States Patent [19]

Sasaki

[11] Patent Number: 5,135,797
[45] Date of Patent: Aug. 4, 1992

[54] DECORATIVE FILM FOR A RUBBER ARTICLE

[75] Inventor: Makoto Sasaki, Shizuoka, Japan

[73] Assignee: Minnesota Mining and Manufacturing Company, St. Paul, Minn.

[21] Appl. No.: 700,498

[22] Filed: May 15, 1991

[51] Int. Cl.⁵ .................. B32B 7/14; B32B 27/08
[52] U.S. Cl. ................... 428/201; 428/423.3; 428/424.4; 428/424.8; 428/425.8; 428/412; 428/462; 428/463; 428/473.5; 428/474.4; 428/517; 428/519; 428/511; 428/494
[58] Field of Search ............ 428/412, 517, 519, 494, 428/201, 473.5, 474.4, 423.3, 424.4, 424.8, 425.8, 511, 462, 463

[56] References Cited

U.S. PATENT DOCUMENTS 4,217,395 8/1980 Kuan et al. .................. 428/494
5,013,379 5/1991 Brooks et al. .............. 428/494 X

FOREIGN PATENT DOCUMENTS 61-187 1/1986 Japan .

Primary Examiner—P. C. Sluby
Attorney, Agent, or Firm—Gary L. Griswold; Water N. Kirn; Steven E. Skolnick

[57] ABSTRACT

A decorative film which is capable of being fused to an ethylene-propylene diene monomer. The film comprises a substrate formed from an ethylene/acrylic acid copolymer or an ethylene/ethyl acrylate copolymer and a synthetic resin elastomer film decoratable layer which is bonded to the substrate by an adhesive.

13 Claims, 1 Drawing Sheet

DECORATIVE FILM FOR A RUBBER ARTICLE

BACKGROUND OF THE INVENTION

1. Field of the Invention

This invention relates to a decorative enhancement for a rubber article and, more particularly, to a decoratively colored and/or patterned film which may be fused to an ethylene-propylene diene monomer (EPDM) rubber article.

2. Description of the Related Art

EPDM is widely used as a rubbery material in, for example, the automotive industry because it exhibits excellent resistance to ozone deterioration, heat degradation and environmental weathering. In the automotive industry, EPDM rubber has been employed to provide window seals, glass runners, door sponges, weatherstrips, door trim, body side moldings, bumper guards, trunk seals, and the like. In order to provide EPDM rubber with at least some of the above-noted desirable qualities, it is typically formulated with carbon black which results in the finished automotive components being colored black.

Increasingly, automotive manufacturers have been demanding EPDM rubber components in colors other than black. In some instances, the manufacturers desire that the EPDM rubber components be colored to match the body color of a motor vehicle. In other instances, it may be desirable to provide the EPDM rubber components in a contrasting color which decoratively and aesthetically highlights the vehicle. Until the development of the present invention, no commercially useful product which satisfies these demands has been available.

Attempts have been made to reformulate EPDM rubber by replacing the carbon black with white colored fillers or additives such as calcium carbonate or clay and then coloring the rubber with appropriate pigments. Unfortunately, EPDM rubber articles colored in this manner exhibit poor resistance to environmental weathering. Furthermore, the durability and the elasticity of the resulting articles is adversely compromised. Consequently, the rubber articles have been supplemented with various adjuvants such as anti-corrosion inhibitors, ultra-violet absorbers, optical stabilizers and the like. Unfortunately, the environmental weather resistance of these "supplemented" materials is not comparable to EPDM rubber formulated with carbon black. (The articles tend to crack and their color changes with the passage of time.)

In an alternative approach, carbon black-modified EPDM rubber has been painted to provide the desired color. In many instances, the paint forms a relatively hard and inflexible coating which is not compatible with the underlying flexible, rubbery substrate. While some paints demonstrate improved flexibility, they tend to exhibit a low surface strength and are not resistant to scratching and bending.

In still a third approach, carbon black-modified EPDM rubber is coextruded with a thin, colored rubber film which is integral with the EPDM. However, this technique is expensive, time consuming and labor intensive. It is difficult and laborious to not only change the color of the coextruded skin but to accurately match the color of the final product to that which is desired. The color development in these products is generally poor due to the presence of certain ingredients, such as sulfur-based vulcanizers. Moreover, since the skin is coextruded, it cannot be provided with a patterned surface. Also, this process requires the use of a special and dedicated extruder, such as a cross-head type extruder. An example of this approach is disclosed in Japanese Patent Publication No. 61-187.

Consequently, there remains a need for a flexible, durable, colored EPDM rubber article which may be efficiently and economically produced.

SUMMARY OF THE INVENTION

This invention relates to a decorative film which is capable of being fused to an ethylene-propylene diene monomer (EPDM) rubber article. The decorative film comprises a substrate layer and a decoratable layer which is bonded to the substrate layer by an adhesive. The substrate layer comprises either an ethylene/acrylic acid copolymer or an ethylene/ethyl acrylate copolymer. The ethylene/acrylic acid copolymer preferably comprises from about 80% to about 98% ethylene and, correspondingly, from about 20% to about 2% acrylic acid. Preferably, in the ethylene/ethyl acrylate copolymer, ethylene is provided in an amount ranging from about 80% to about 98% and, correspondingly, ethyl acrylate is provided in an amount ranging from about 20% to about 2%.

The decoratable layer may be formed from an ionomer resin, a fluorine containing resin, or a polyurethane. Preferably, the decoratable layer has an ultimate elongation of at least 20% and an elastic limit of at least 5%. The decoratable layer may include a layer of metal and may be printed or colored.

Optionally, the decorative film may further include a protective layer on the decoratable layer. The protective layer may be formed from a polyester, a carbonate, triacetyl cellulose, a polyamide, a polyimide, a polyvinyl chloride, a polytetrafluoroethylene, cellophane, parchment paper or condenser paper.

Decorative films according to the invention are an efficient and effective means for providing carbon black modified EPDM rubber articles with a patterned and/or vividly colored appearance not heretofore possible.

BRIEF DESCRIPTION OF THE DRAWINGS

The invention will be more fully understood with reference to the following drawings in which similar reference numerals identify analogous or corresponding components throughout and in which.

DETAILED DESCRIPTION OF THE PREFERRED EMBODIMENTS

Figure 1:
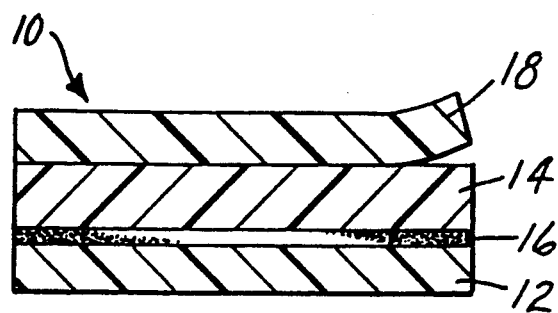
FIG. 1 is an enlarged cross-sectional view of a decorative film for a rubber article according to the invention.

Turning now to the drawings, FIG. 1 is an enlarged, cross-sectional view of a decorative film 10 for a rubber article according to the invention. The film 10 comprises a substrate layer 12, a decoratable layer 14, an adhesive layer 16, and, optionally, a protective layer 18. As explained more fully hereinbelow, the decorative film 10 may be readily applied to an ethylene-propylene diene monomer (EPDM) rubber article so as to provide a decorative and aesthetic enhancement therefor.

The substrate layer 12 comprises either an ethylene/acrylic acid (EAA) copolymer or an ethylene/ethyl acrylate (EEA) copolymer. The EAA copolymer preferably comprises from about 80% to about 98% ethylene and, correspondingly, from about 20% to about 2% acrylic acid. Similarly, the EEA copolymer preferably comprises from about 80% to about 98% ethylene and, correspondingly, from about 20% to about 2% ethyl acrylate.

The substrate layer 12 has a heat-fusion property which facilitates the bonding or fusing thereof to an EPDM rubber article, as explained more fully below. The substrate layer 12 has a fusing point in the range of approximately 190°-230° C. and exhibits high flowability when fused to an EPDM rubber article in this temperature range. By "high flowability" it is meant that the substrate layer 12 material flows well when heated to the fusing point and provides good wetting of the EPDM rubber article. The substrate layer 12 may be prepared by for example, an extrusion process. There is no particular limitation on the thickness of the substrate layer 12 although, preferably, it will be in the range of approximately 10-100 microns.

The decoratable layer 14 is preferably provided in the form of a synthetic resin elastomer film. Materials suitable as the decoratable layer 14 include, for example, ionomer resins, i.e., cross-linked copolymers comprising ethylene and a vinyl monomer having an acidic group such as methacrylic acid. Commercial examples of useful ionomer resins include materials sold under the trade designation SURLYN (available from E.I. duPont de Nemours & Co., Wilmington, Del.). Other materials useful as the decoratable layer 14 include polyurethanes and fluorine-containing resins such as, for example, polytetrafluoroethylene and copolymers of tetrafluoroethylene and ethylene.

In general, the decoratable layer 14 should be flexible and elastic. Preferably, the decoratable layer 14 will exhibit an ultimate elongation (that is, an elongation at break) of at least about 20% (measurable in a tensile tester according to ASTM D-882) and an elastic limit of at least 5%. By "elastic limit" is meant the extent to which the decoratable layer may be stretched without permanent deformation. The decoratable layer 14 should also exhibit good environmental weathering resistance, good heat resistance, and good adhesion to the substrate layer 12. Following an environmental weathering test, the decoratable layer should not be cracked. The decoratable layer 14 should be readily printable and capable of being colored through the addition of dyes, pigments and the like. Preferably, the decoratable layer 14 has a thickness in the range of 0.01-3 mm and, more preferably, in the range of 0.03-0.2 mm. In general, decoratable layer 14 thicknesses which exceed about 3 mm may not be sufficiently conformable to the underlying EPDM rubber article.

The decoratable layer 14 is secured to the substrate layer 12 by way of the adhesive layer 16. Preferably, the adhesive layer 16 is formed of a relatively soft adhesive material which is flexible and elastic. Materials suitable for the adhesive layer 16 include, for example, synthetic resin type adhesives, e.g., polyurethane adhesives, an example of which is the material having the trade designation N-3124 (available from the Nippon Polyurethane Company, Japan) and rubber type adhesives such as, for example, SCOTCH-GRIP EC 1368 and EC 847 brand adhesives, commercially available from the Minnesota Mining and Manufacturing Company, St. Paul, Minn.

The adhesive layer 16 is applied to the decoratable layer 14 by dissolving the adhesive material in a solvent in which the decoratable layer is insoluble. Examples of suitable solvents include isopropyl alcohol, ethyl acetate, isopropyl alcohol/toluene and napthas. Emulsions of an adhesive may also be used. The adhesive/solvent (or emulsion) system is applied to the decoratable layer 14 by roll-coating, gravure printing or the like and then dried. The decoratable layer 14 having the adhesive layer 16 thereon is subsequently laminated and pressed onto the substrate layer 12 so as to provide the decorative film 10.

The decorative film 10 may further and optionally comprise the protective layer 18. In general, the protective layer 18 should exhibit relatively high heat resistance (at least up to about 200°-300° C., the intended temperature for lamination of the film 10 to an EPDM rubber article). Suitable materials for the protective layer 18 include, for example, films of polyester, polycarbonate, triacetyl cellulose, polyamide, polyimide, polyvinyl chloride, polytetrafluoroethylene, and cellophane, parchment paper, and condenser paper. The protective layer 18 is laminated to the decoratable layer 14 on the surface opposite the surface bearing the adhesive layer 16. The protective layer 18 prevents unintentional marring or damage to the decoratable layer 14 prior to the application of the decorative film 10 to an EPDM rubber article.

Figure 2:
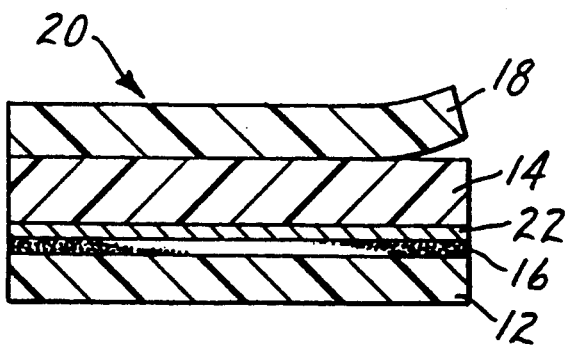
FIG. 2 is an enlarged cross-sectional view of a second embodiment of a decorative film for a rubber article according to the invention.

A second embodiment of a decorative film material for an EPDM rubber article is illustrated in the enlarged cross-sectional view of FIG. 2. FIG. 2 shows a decorative film 20 similar to that illustrated in FIG. 1. The film 20 comprises a substrate layer 12, a decoratable layer 14 bonded to the substrate layer by an adhesive layer 16 and, optionally, a protective layer 18, all as described more fully above. The decorative film 20 of FIG. 2 further comprises a layer of metal 22 which has been deposited on the decoratable layer 14 by, for example, sputter coating, and which is interposed between the decoratable layer and the adhesive layer 16. The metal layer 22 may be formed from aluminum, chromium, nickel and alloys thereof.

In general, the decorative film 10 or 20 is provided in the form of precolored and/or preprinted sheets which may be readily cut to any desired size and then laminated (sometimes referred to as fused) to an EPDM rubber article (not shown separately in the drawings) by heat pressing or heat rolling at a temperature in the range of approximately 200°-300° C. Alternatively, the decorative film 10 or 20 may be applied to an EPDM rubber article by a heat vacuum process or inmold injection. Once the decorative film 10 or 20 has been applied to the EPDM rubber article, the protective layer 18 may be removed. The decorative film 10 or 20 may be applied to molded, extruded or foamed EPDM rubber articles.

The following examples are offered to further illustrate the invention and are not to be construed as limiting the scope thereof.

EXAMPLE 1

Polyurethane adhesive N-3124 (commercially available from the Nippon Polyurethane Company, Japan) was roll coated onto a 60 micron thick colored polyurethane film and then dried to provide an adhesive layer 5-10 microns thick. The adhesive coated polyurethane film demonstrated an ultimate elongation of 150% and an elastic limit greater than 10%. The adhesive coated polyurethane film was then laminated to an EAA film (97% ethylene, 3% acrylic acid) approximately 75 microns thick. A protective layer of polyester approximately 50 microns thick was laminated to the polyurethane film on the side opposite the adhesive bearing side.

The composite film structure was then laminated to an EPDM rubber plate (which had been formulated with carbon black) approximately 5 mm thick. The EAA film layer engaged the EPDM rubber plate and was fused thereto at a temperature of approximately 230° C. with pressure. The so laminated structure was allowed to cool and the polyester protective film layer was removed.

Adhesion between the EPDM rubber article and the decorative film material was excellent. Adhesion between an EPDM rubber article and a decorative film material may be described as excellent if in a peel adhesion test, the composite structure comprising the EPDM rubber article and decorative film material suffers cohesive rather than adhesive failure (i.e., the decorative film material or the EPDM rubber article fail rather than the adhesive bond between the two).

The ability of the decorative film of Example 1 to resist environmental weathering was determined by a 200 hour Sunshine Carbon Ark Weather-O-Meter exposure test and outdoor exposure (facing south at a 45° incline) for about two years. At the conclusion of these tests, the decorative film had an acceptable external appearance and no delamination between the layers was observed. The decorative film remained conformable to the EPDM rubber article. Repeated (ten times) bending did not result in cracking or wrinkling of the decorative film.

EXAMPLE 2

A transparent polyurethane film approximately 60 microns thick and further including a layer of sputter coated chromium on one side thereof was coated with N-3124 polyurethane adhesive and then dried to provide an adhesive layer approximately 5-10 microns thick. The adhesive-coated, metallized polyurethane film demonstrated an ultimate elongation of 30% and an elastic limit greater than 5%. The adhesive coated polyurethane film was laminated to a 75 micron thick EAA (94% ethylene, 6% acrylic acid) film layer and a polyester protective film approximately 50 microns thick was laminated to the polyurethane film on the side opposite the side bearing the adhesive. The decorative film was fused to an EPDM rubber article approximately 5 mm in thickness at 230° C. with pressure.

EXAMPLE 3

A colored ionomer resin film (SURLYN, commercially available from E.I. duPont de Nemours & Co.) approximately 100 microns thick was corona discharge treated on one surface thereof so as to improve the receptivity of the film surface to a subsequently applied polyurethane adhesive. The adhesive coated ionomer resin film was dried to provide an adhesive layer approximately 5-10 microns thick. The adhesive coated ionomer film was laminated to a 75 micron thick EAA film followed by the lamination of a 50 micron thick polyester protective layer to the ionomer film. The decorative film was fused to an EPDM rubber article as described more fully above in examples 1 and 2. The EPDM rubber article including the decorative film was evaluated for flexibility and weather resistance, both of which were found to be good.

COMPARATIVE EXAMPLE 1

A decorative film was prepared according to example 1 with the exception that the 60 micron thick colored polyurethane film was replaced with a 60 micron thick layer of a colored, hard vinyl chloride film. The resulting film was bonded to an EPDM rubber article. The film of comparative example 1 wrinkled when flexed and was not sufficiently conformable to the EPDM rubber article. The hard vinyl chloride film employed in this comparative example lacked sufficient flexibility to be useful as the decoratable layer in the invention.

COMPARATIVE EXAMPLE 2

A decorative film was prepared in accordance with example 1 with the exception that the colored polyurethane film thereof was substituted by a colored polyurethane film having an ultimate elongation of 30% but an elastic limit of less than 5%. The decorative film of comparative example 2 wrinkled when the EPDM rubber article was bent and did not conform to the rubber article. Thus, the decorative film of comparative example 2 was determined not to be useful in the invention.

Decorative films according to the invention are an efficient and effective means for providing carbon black modified EPDM rubber articles with a patterned and/or vividly colored appearance. Presently known EPDM rubber articles formulated without carbon black and colored by the addition of pigments show poor color development following vulcanization. The present invention also provides multicolored EPDM rubber articles not heretofore known.

Reasonable variations or modifications are possible within the foregoing specification and drawings without departing from the scope of the invention which is defined in the accompanying claims.

The embodiments for which an exclusive property or privilege is claimed are defined as follows:

1. A decorative film which is capable of being fused to an ethylene-propylene diene monomer said film comprising:
   (a) a substrate layer formed from a material selected from the group consisting of ethylene/acrylic acid copolymers and ethylene/ethyl acrylate copolymers;
   (b) a decoratable layer formed from a synthetic resin elastomer film, said decoratable layer having an ultimate elongtion of at least about 20% and an elastic limit of at least about 5%; and
   (c) a layer of an adhesive which bonds said decoratable layer to said substrate layer.

2. A decorative film according to claim 1 wherein said ethylene/acrylic acid copolymer comprises from about 80% to about 98% ethylene and, correspondingly, from about 20% to about 2% acrylic acid.

3. A decorative film according to claim 1 wherein said ethylene/ethyl acrylate copolymer comprises from about 80% to about 98% ethylene and, correspondingly, from about 20% to about 2% ethyl acrylate.

4. A decorative film according to claim 1 wherein said substrate layer has a fusing point in the range of approximately 190°-230° C.

5. A decorative film according to claim 1 wherein said synthetic resin elastomer film is formed from a material selected from the group consisting of ionomer resins, fluorine-containing resins and polyurethanes.

6. A decorative film according to claim 1 wherein said adhesive is selected from the group consisting of polyurethane adhesives and rubber adhesives.

7. A decorative film according to claim 1 and further comprising a protective layer on said decoratable layer.

8. A decorative film according to claim 7 wherein said protective layer is formed from a material selected from the group consisting of polyester, polycarbonate, triacetyl cellulose, polyamide, polyimide, polyvinyl chloride, polytetrafluoroethylene, cellophane, parchment paper, and condenser paper.

9. A decorative film according to claim 1 and further comprising a layer of metal on said decoratable layer.

10. A decorative film according to claim 9 wherein said metal layer is formed from a material selected from the group consisting of aluminum, chromium, nickel and alloys thereof.

11. A decorative film according to claim 1 wherein said decoratable layer is colored.

12. A decorative film according to claim 1 wherein said decoratable layer has a pattern formed thereon.

13. An article comprising an ethylene-propylene diene monomer base and a decorative film according to claim 1 fused to said base.

* * * * *

UNITED STATES PATENT AND TRADEMARK OFFICE
CERTIFICATE OF CORRECTION

PATENT NO. : 5,135,797
DATED : August 4, 1992
INVENTOR(S) : Makoto Sasaki

It is certified that error appears in the above-identified patent and that said Letters Patent is hereby corrected as shown below:

Column 3, line 18, "prepared by for example" should read --prepared by, for example--.

Column 6, line 49 "ultimate elongtion" should read ---ultimate elongation--.

Signed and Sealed this

Seventh Day of June, 1994

Attest:

Attesting Officer

BRUCE LEHMAN

Commissioner of Patents and Trademarks